United States Patent [19]
Khare

[11] Patent Number: 5,710,089
[45] Date of Patent: Jan. 20, 1998

[54] SORBENT COMPOSITIONS

[75] Inventor: Gyanesh P. Khare, Bartlesville, Okla.

[73] Assignee: Phillips Petroleum Company, Bartlesville, Okla.

[21] Appl. No.: 482,696

[22] Filed: Jun. 7, 1995

[51] Int. Cl.$^6$ .............. P01J 20/06; P01J 20/12; P01J 20/30
[52] U.S. Cl. .............. 502/407; 502/415
[58] Field of Search .............. 502/307, 407, 502/415, 342, 343

[56] References Cited

U.S. PATENT DOCUMENTS

| | | | |
|---|---|---|---|
| 4,025,460 | 5/1977 | Ueda et al. | 252/457 |
| 4,048,115 | 9/1977 | O'hara | 252/465 |
| 4,088,736 | 5/1978 | Courty et al. | 423/230 |
| 4,234,455 | 11/1980 | Homeier et al. | 252/430 |
| 4,254,616 | 3/1981 | Siminski et al. | 60/39.12 |
| 4,316,822 | 2/1982 | Fujitani et al. | 252/462 |
| 4,325,808 | 4/1982 | Kim et al. | 208/65 |
| 4,977,123 | 12/1990 | Flytzani-Stephanopoulous et al. | 502/84 |
| 4,990,318 | 2/1991 | Kidd | 423/230 |
| 5,244,641 | 9/1993 | Khare | 423/220 |
| 5,248,489 | 9/1993 | Kidd et al. | 423/220 |

FOREIGN PATENT DOCUMENTS

| | | | |
|---|---|---|---|
| 0 401 789 | 12/1990 | European Pat. Off. | B01J 20/02 |
| 0 553 796 | 8/1993 | European Pat. Off. | B01J 20/06 |

OTHER PUBLICATIONS

Letter of Sep. 8, 1993, from D.J. Makovec to J. Devine.
Letter of Nov. 18, 1993, from G. Greenwood to J. Evans.
Letter of Nov. 18, 1993, from G. Greenwood to C. Heisey.

*Primary Examiner*—Helane Myers
*Assistant Examiner*—Alexander G. Ghyka
*Attorney, Agent, or Firm*—Carl D. Corvin

[57] ABSTRACT

A process to make a sorbent composition said process comprising: (a) contacting (i) at least one zinc component, where said zinc component consists essentially of zinc oxide, or a compound convertible to zinc oxide, (ii) at least one silica component, where said silica component consists essentially of silica, or a compound convertible to silica, (iii) at least one colloidal oxide component, where said colloidal oxide component consists essentially of particles of a metal oxide where said metal oxide is selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, (iv) at least one pore generator component, wherein the amount of pore generator is from 1 to about 15 weight percent based on the total weight of said sorbent composition, and wherein said sorbent composition consists essentially of components (a)(i) through (a)(iv) to form a moist composition, where said moist composition has a moisture content from about 22 to about 31 weight percent based on the weight of said moist composition; (b) extruding said moist composition to form an extruded, moist composition where said extruded, moist composition has a moisture content from about 22 to about 31 weight percent based on the weight of said extruded, moist composition; and (c) sphering said extruded, moist composition to form a sphered, extruded, moist composition that has a particle size from about 0.5 to about 15 millimeters.

102 Claims, No Drawings

SORBENT COMPOSITIONS

BACKGROUND

This invention relates to the field of sorbent compositions.

The removal of sulfur from fluid streams has long been desirable, as well as necessary, for a variety of reasons. If a sulfur-containing-fluid-stream is to be released as a waste stream, removal of the sulfur from the fluid stream is often necessary to meet certain environmental regulations. If a sulfur-containing-fluid-stream is to be used in a catalyzed process, removal of the sulfur is often necessary to prevent poisoning of the catalyst.

It is desirable for sorbents to have higher crush strengths because such sorbents will have lower attrition losses, and consequently, a longer life. This lowers the costs associated with sulfur removal processes. Furthermore, it is desirable for sorbents to have higher sulfur loading capacity because such sorbents will remove more sulfur per unit, and consequently, less sorbent is needed. This also lowers the costs associated with sulfur removal processes.

SUMMARY

It is an object of this invention to provide a process to produce a sorbent composition.

In accordance with this invention a process is provided comprising (a) contacting (i) at least one zinc component, where said zinc component comprises zinc oxide, or a compound convertible to zinc oxide, (ii) at least one silica component, where said silica component comprises silica, or a compound convertible to silica, (iii) at least one colloidal oxide component, and (iv) at least one pore generator component, to form a moist composition, where said moist composition has a moisture content from about 22 to about 33 weight percent based on the weight of said moist composition; (b) extruding said moist composition to form an extruded, moist composition where said extruded, moist composition has a moisture content from about 22 to about 33 weight percent based on the weight of said extruded, moist composition; and (c) sphering said extruded, moist composition to form a sphered, extruded, moist composition that has a particle size from about 0.5 to about 15 millimeters.

DETAILED DESCRIPTION OF THE INVENTION

Sorbent compositions of this invention comprise (or optionally, consist essentially of, or consist of) a zinc component, a silica component, a colloidal oxide component, and a pore generator component.

Generally, the zinc component is zinc oxide. However, it may be a compound that is convertible to zinc oxide under the conditions of preparation described herein. Examples of such compounds include, but are not limited to, zinc sulfide, zinc sulfate, zinc hydroxide, zinc carbonate, zinc acetate, and zinc nitrate. The amount of the zinc component present in the sorbent composition is in the range of about 10 to about 90 weight percent based on the total weight of the sorbent composition. However, an amount in the range of about 25 to about 75 weight percent is preferred and an amount in the range of about 40 to about 60 weight percent is most preferred.

The silica component can be any naturally occurring silica, such as, for example, diatomaceous earth, which is also called kieselguhr, diatomite, infusorial earth, and Celite®. The silica component can also be any synthetic silica such as, for example, zeolite, precipitated silica, spray dried silica, clay, plasma-treated silica, and plasma-treated clay. Additionally, the silica component can be in the form of one or more silica compounds that are convertible to silica under the conditions of preparation described herein. Examples of suitable silicas include, but are not limited to, diatomite, silicate, flame hydrolyzed silica, hydrolyzed silica, and precipitated silica. The amount of the silica component present in the sorbent composition is in the range of about 10 to about 60 weight percent based on the total weight of the sorbent composition. However, an amount in the range of about 20 to about 50 weight percent is preferred and an amount in the range of about 30 to about 40 weight percent is most preferred.

The colloidal oxide component is generally a liquid medium comprising finely divided, colloidal-size particles of a metal oxide. These particles are, in general, homogeneously distributed throughout the liquid medium. The size of these particles varies, but in general, the size of the particles is in the range of about 10 to about 10,000 angstroms. Typical solid concentrations in such colloidal oxide components can range from about 1 to about 30 weight percent based on the total weight of the colloidal oxide component. The pH of the colloidal oxide component can range from about 2 to about 11 depending on the method of preparation of the colloidal oxide component. In another embodiment, the colloidal oxide component does not have to be in a liquid medium. In this embodiment, the colloidal oxide can be a solid comprising particles of a metal oxide. For example, the colloidal oxide component can be a powder comprising particles of a metal oxide. However, when the colloidal oxide is a solid comprising particles of a metal oxide, it should have the ability to be readily dispersed in a liquid medium. In other words, if the colloidal oxide component is a solid comprising particles of a metal oxide, then under the conditions of preparation of the sorbent, the colloidal oxide should be able to form a dispersion that contains colloidal-size particles. The metal oxide, in a preferred embodiment, is selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures of two or more of said metal oxides. Currently, in a more preferred embodiment, the colloidal oxide component comprises colloidal alumina, colloidal silica, or mixtures thereof. The amount of the metal oxide present in the sorbent composition from the colloidal oxide component is in the range of about 1 to about 30 weight percent based on the total weight of the sorbent composition. However, an amount in the range of about 1 to about 20 weight percent is preferred and an amount in the range of about 5 to about 15 weight percent is most preferred.

The pore generator component can be any compound that can be mixed with the above components, and that is combustible upon heating thereby producing voids within the sorbent composition. This pore generator helps to maintain and/or increase the porosity of the sorbent composition. Examples of such pore generators include, but are not limited to, cellulose, cellulose gel, microcrystalline cellulose, methyl cellulose, zinc stearate, ammonium carbonate, ammonium nitrate, and graphite. The amount of the pore generator component present in the sorbent composition is in the range of about 0.1 to about 15 weight percent based on the total weight of the sorbent composition. However, an amount in the range of about 1 to about 10 weight percent is preferred and an amount in the range of about 3 to about 6 weight percent is most preferred.

The above four components can be contacted together in any manner known in the art. Additionally, they can be contacted in any order. However, it is more efficient to contact the colloidal oxide component with the silica component before they are contacted with the zinc component and the pore generator component. This facilitates the colloidal oxide component's coverage of the silica component. In other words, it is preferred if the colloidal oxide component coats the silica component. This coating should be, for best results, substantially homogeneous.

After contacting together all of these components a moist composition should be obtained. This moist composition should have a moisture content greater than 20 weight percent, but less than 40 weight percent, based on the weight of said moist composition. However, it is more preferable if the moisture content is in the range of about 22 to 33 weight percent. The moist composition should then be subjected to an extruding step to form an extruded, moist composition. This extruded, moist composition should have a moisture content greater than 20 weight percent, but less than 40 weight percent, based on the weight of said extruded, moist composition. However, it is more preferable if the moisture content is in the range of about 22 to 33 weight percent. Additionally, it is even more preferred if the moisture content of said extruded, moist composition is about the same as the moisture content of said moist composition. In other words, it is preferred if the moisture content of said extruded, moist composition is within about 10 percent, preferably 5 percent of the moisture content of said moist composition.

The extruded, moist composition is then subjected to a sphering step to form a sphered, extruded, moist composition. The sphering step should be sufficient to form the extruded, moist composition into substantially spherical particles that have a particle size from about 0.5 to about 15 millimeters. However, it is more preferred if such particles have a particle size of about 1 to about 10 millimeters, and it is most preferred if such particles have a particle size from about 2 to about 8 millimeters. These particles can have a shape from a cylindrical object with rounded edges to a spherical object with substantially no sharp edges. This sphering step can be accomplished in a variety of ways. A particularly preferred apparatus that can accomplish this sphering step is a Marumerizer™. These types of apparatuses are available from a variety of commercial sources.

The sphered, extruded, moist composition can than be dried to form a dried, sphered, extruded composition (hereafter "dried composition"). This drying step is generally used to remove the liquid medium of the colloidal oxide component. The drying step can be conducted at any temperature suitable for removing substantially all of the liquid medium. These temperatures are generally in the range of about 50° to about 300° C. However, it is more preferred if the temperature is in the range of about 100° to about 200° C. Drying times depend upon the liquid medium and the drying temperature, but in general, drying times of about 0.5 to about 4 hours are preferred.

The dried composition can then be calcined to form a calcined composition. The calcination can be conducted under any suitable conditions that remove water and oxidize combustibles. The dried composition should be calcined in an oxygen containing ambient. Generally, the temperature that the calcination takes place at is in the range of about 300° to about 800° C. However, it is more preferred if the temperature is in the range of about 450° to about 750° C. The calcination should be conducted for a period of time in the range of about 0.5 to about 4 hours. Generally, any zinc component that is not in the form of zinc oxide can be converted to zinc oxide at this point of the preparation. Additionally, any silica component that is not in the form of silica can be converted to silica at this point of the preparation.

It is sometimes desirable to have the sorbent composition include a Group VIII metal oxide promoter. These promoters can improve the physical and chemical properties of the sorbent composition. For example, these metal oxide promoters can increase the ability of the sorbent composition to hydrogenate sulfur oxide to hydrogen sulfide. Furthermore, such promoters can increase the ability of the sorbent composition to regenerate after becoming spent in a sulfur removal process. Examples of suitable Group VIII metal oxide promoters include, but are not limited to, iron oxide, cobalt oxide, nickel oxide, ruthenium oxide, rhodium oxide, palladium oxide, osmium oxide, iridium oxide, and platinum oxide. The amount of metal oxide promoter in the sorbent composition is in the range of about 0.1 to about 20 weight percent based on the weight of the sorbent composition. However, it is more preferable if the amount is in the range of about 1 to about 15 weight percent, and most preferably the amount is in the range of about 5 to about 10 weight percent.

The metal oxide promoter can be added to the sorbent composition in the form of the elemental metal, metal oxide, and/or metal-containing compounds that are convertible to metal oxides under the calcining conditions described herein. Some examples of such metal-containing compounds include metal acetates, metal carbonates, metal nitrates, metal sulfates, metal thiocyanates and mixtures of any two or more thereof.

The elemental metal, metal oxide, and/or metal-containing compounds can be added to the sorbent composition by any method known in the art. One such method is the impregnation of the sorbent composition with a solution, either aqueous or organic, that contains the elemental metal, metal oxide, and/or metal-containing compounds. After the elemental metal, metal oxide, and/or metal-containing compounds have been added to the sorbent composition, the promoted composition is dried and calcined, as described hereinafter.

The elemental metal, metal oxide, and/or metal-containing compounds can be added to the sorbent composition as components of the original mixture, or they can be added after the sorbent composition has been dried and calcined. If the metal oxide promoter is added to the sorbent composition after it has been dried and calcined, then the now-promoted composition is dried and calcined a second time. The now-promoted composition is preferably dried at a temperature in the range of about 50° C. to about 300° C., but more preferably, the drying temperature will range from about 100° C. to about 250° C., for a period of time in the range of about 0.5 hour to about 8 hours, more preferably in the range of about 1 hours to about 5 hours. The dried, promoted composition is then calcined in the presence of oxygen, or an oxygen-containing gas, at a temperature in the range of about 300° C. to about 800° C., and more preferably in the range of about 450° C. to about 750° C., until volatile matter is removed and until at least a portion of the elemental metal and/or the metal-containing compounds is converted to a metal oxide. The time required for this calcining step will generally be in the range of about 0.5 hour to about 4 hours, and will preferably be in the range of about 1 hour to about 3 hours.

The sorbent compositions of this invention can be used in sulfur removal processes where there is achieved a contacting of the sorbent composition with a sulfur-containing gaseous feed stream, and thereafter, of the sorbent composition with oxygen. or an oxygen-containing gas, which is utilized to regenerate the sorbent composition. The sulfur removal process is in no way limited to the use of a particular apparatus. The sulfur removal process can be carried out using a fixed bed of sorbent composition, a fluidized bed of sorbent composition, or a moving bed of sorbent composition.

Examples of such sulfur removal processes are disclosed in U.S. Pat. Nos. 4,990,318; 5,077,261; 5,102,854; 5,108, 975; 5,130,288; 5,174,919; 5,177,050; 5,219,542; 5,244, 641; 5,248,481; and 5,281445; the disclosures of which are hereby incorporated by reference.

EXAMPLE

This example is intended to be illustrative of the invention and is not meant to be construed as limiting the scope of the invention.

Four sorbent samples were prepared and tested. The four sorbent samples are outlined in Table 1.

TABLE 1

| Sample Designation | Sorbent Samples | | | |
|---|---|---|---|---|
| | A | B | C | D |
| With Cellulose | No | No | Yes | Yes |
| Sphered | No* | Yes | Yes | No* |

*Non-Sphered samples were pelletized.

Preparation of Sample A:

Twenty pounds of Celite® was placed in a mix muller. While mixing, the Celite® powder was spray impregnated over a period of six to eight minutes with 24.4 pounds of Nyacol Al-20 colloidal alumina using a pump and spray nozzle. To this was added, in small increments, 25.0 pounds of zinc oxide, with mixing for 22–24 minutes. As needed, the sides, blades and wheels of the mixer were scraped to ensure a homogeneous mix. The total mix time including alumina addition did not exceed thirty minutes. The moisture content of the mix was between 26–27%. The mix had a moist, powdery appearance at this point. The mix was then extruded using a screw extruder with water-cooled barrel controlled at 45°–50° C. The extrudate was dried on trays in an air circulating oven at 150° C. for three hours. The dried extrudate was calcined at 635° C. for one hour using a belt calciner. Nickel was then spray impregnated onto the calcined base in a coater using nickel(II) nitrate dissolved in water. The aqueous nickel solution used was prepared by dissolving 134.7 grams of nickel(II) nitrate hexahydrate per pound of calcined base in sufficient water to effect an 85% incipient wetness impregnation. After impregnation, the material was dried at 150° C. for three hours and calcined at 635° C. for one hour. The resulting material was designated "Sample A."

Preparation of Sample B:

Sample B was prepared exactly as detailed above for Sample A except that the extrudate from the screw extruder was fed to a Marumerizer™ and processed for thirty seconds at 300 rpm using a plate with a 5 mm grove prior to being dried, calcined, impregnated, dried and calcined as indicated in the preparation of Sample A. The resulting material was designated "Sample B."

Preparation of Sample C:

Sample C was prepared exactly as indicated for Sample B, above, except that 0.131 pounds of Avicel® Cellulose PH 102 per pound of Celite® powder was added to the composition ten minutes subsequent to the zinc oxide addition and ten minutes prior to completion of mixing in the mix muller. The resulting composition, following completion of the remaining steps indicated in the preparation of Sample B, above, was designated "Sample C."

Preparation of Sample D:

Sample D was prepared exactly as indicated Sample C, above, except that for Sample D the step involving use of a Marumerizer™ was omitted, i.e. the product from the mix muller was only extruded, as in the preparation of Sample A, above. Following completion of the remaining steps as indicated in the preparation of Sample C, above, the resulting material was designated "Sample D."

Sulfur Loading Test

The tests were carried out in a unit comprising a 20 mm O.D. quartz reactor and a 2 mm thermocouple well. The reactor, which was maintained at a pressure of about 1.7 psig, was operated in a fixed bed down flow mode using 10 grams of the tested sorbent. The sorbent was heated to 800° F. in a stream of nitrogen. When the desired temperature was obtained, the nitrogen stream was replaced with a stream of simulated sulfur plant feed gas comprising 4.2 volume percent hydrogen sulfide, 40.0 volume percent carbon dioxide and 55.8 volume percent nitrogen. The gas hourly space velocity was 1450 cc/cc sorbent/hour. Sulfur absorption was monitored by measuring the concentration of hydrogen sulfide in the reactor effluent, using a General Monitors hydrogen sulfide monitor suited to the concentration ranges encountered. Once the sorbent was fully sulfided, as evidenced by hydrogen sulfide breakthrough, the flow of the simulated sulfur plant gas to the reactor was halted and the reactor was purged with nitrogen for 45 minutes while it was heated to a regeneration temperature of 1100° F. The sulfided sorbent was regenerated in a stream of air at 200 cc/minute for about 5 hours. Then the reactor was purged with nitrogen for about 40 minutes as it was cooled to 800° F. Then, the nitrogen flow was halted and the flow of simulated sulfur plant feed gas was resumed to begin another absorption cycle. The process was repeated for the desired number of cycles. The results of testing Samples A, B, C and D are shown in Table 2.

TABLE 2

| Sulfur Loading Test Results* | | | | |
|---|---|---|---|---|
| Cycle Number | Sample A | Sample B | Sample C | Sample D |
| 1 | 12.4 | 7.6 | 14.2 | 13.5 |
| 2 | 14.2 | 7.6 | 13.3 | 15.3 |
| 3 | 14.3 | 9.1 | 13.9 | 15.5 |
| 4 | 13.7 | 9.9 | 13.9 | 15.5 |
| 5 | 13.7 | 10.3 | 13.4 | 15.7 |
| 6 | 13.7 | 10.4 | 12.9 | 15.7 |
| 7 | 13.8 | 8.5 | 12.8 | 15.7 |
| 8 | 13.5 | 7.6 | 12.4 | 15.7 |
| 9 | 13.3 | 8.0 | 12.0 | 15.5 |
| 10 | 13.5 | 8.5 | 12.1 | 15.5 |
| 11 | 13.5 | 8.1 | 12.1 | 15.5 |
| 12 | 13.5 | 8.1 | 12.0 | 15.7 |
| 13 | 13.3 | 8.5 | 12.1 | Not tested. |
| 14 | 13.3 | 8.4 | 12.0 | Not tested. |
| 15 | 13.7 | 8.3 | 11.8 | Not tested. |
| 16 | 13.0 | 8.0 | 11.8 | Not tested. |

*Values in Table 2 are the weight percent sulfur in sorbent at hydrogen sulfide breakthrough.

The data in Table 2 clearly show that sphering of a given sorbent composition (as opposed to pelletization without sphering) decreases the sulfur loading of the sorbent. This can be seen by comparing the sulfur loading results for Sample A to those for Sample B and by comparing the sulfur loading results for Sample D to those for Sample C. In addition, the data in Table 2 also clearly show that using a pore generator component during the preparation of a given sorbent composition (as opposed to not using a pore generator component increases the sulfur loading of the sorbent. This can be seen by comparing the sulfur loading results for Sample A with those for Sample D and by comparing the sulfur loading results for Sample B with those for Sample C.

Attrition Testing:

The attrition resistance of Samples A, B, C and D were tested using ASTM D4058-87. The results are shown in Table 3.

TABLE 3

Attrition Testing Results

| Sample | A | B | C | D |
| --- | --- | --- | --- | --- |
| % Attrition | 3.66 | 0.76 | 1.48 | 3.70 |

The data in Table 3 show that the attrition resistance of a given composition is higher when it has been sphered than it is when it has just been extruded. This can be seen by comparing the attrition results for Sample A with those for Sample B and by comparing the attrition results for Sample D with those for Sample C.

By examining the results shown in Table 2 within the context of the results shown in Table 3, it can be seen that combining the pore generator with sphering, a sorbent can be produced which exhibits the sulfur loading capability similar to that of non-inventive compositions but with much improved attrition resistance. This can be seen by comparing the sulfur loading and attrition results for Sample A with those for Sample C. The examinations involving both Table 2 and Table 3 also show that Sample C has the best combination of reasonably high sulfur loading coupled with reasonably low attrition. Although Sample D has higher sulfur loading, it has undesirably high attrition. Also, although Sample B has quite low attrition, it has undesirably low sulfur loading. Finally, while Sample A has sulfur loading similar to that of Sample C, Sample A has undesirably high attrition. Thus, Sample C is clearly the sample of choice when reasonably high sulfur loading is desired in combination with reasonably low attrition.

That which is claimed:

1. A process to make a sorbent composition said process comprising:
   (a) contacting
      (i) at least one zinc component, where said zinc component consists essentially of zinc oxide, or a compound convertible to zinc oxide,
      (ii) at least one silica component, where said silica component consists essentially of silica, or a compound convertible to silica,
      (iii) at least one colloidal oxide component, where said colloidal oxide component consists essentially of particles of a metal oxide where said metal oxide is selected from the group consisting of alumina silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof,
      (iv) at least one pore generator component, wherein the amount of pore generator is from 1 to about 15 weight percent based on the total weight of said sorbent composition, and
   wherein said sorbent composition consists essentially of components (a)(i) through (a)(iv) to form a moist composition, where said moist composition has a moisture content from about 22 to about 31 weight percent based on the weight of said moist composition;
   (b) extruding said moist composition to form an extruded, moist composition where said extruded, moist composition has a moisture content from about 22 to about 31 weight percent based on the weight of said extruded, moist composition; and
   (c) sphering said extruded, moist composition to form a sphered, extruded, moist composition that has a particle size from about 0.5 to about 15 millimeters.

2. A process according to claim 1 where said silica component and said colloidal oxide component are contacted together before they are further contacted with other said components.

3. A process according to claim 2 wherein said zinc component is zinc oxide.

4. A process according to claim 3 wherein said zinc component is present in said sorbent composition in an amount from about 25 to about 75 weight percent based on the weight of said sorbent composition.

5. A process according to claim 3 wherein said zinc component is present in said sorbent composition in an amount from about 40 to about 60 weight percent based on the weight of said sorbent composition.

6. A process according to claim 2 wherein said silica component is selected from the group consisting of diatomite, silicate, flame hydrolyzed silica, hydrolyzed silica, precipitated silica, and mixtures thereof.

7. A process according to claim 6 wherein said silica component is present in said sorbent composition in an amount from about 20 to about 50 weight percent based on the weight of said sorbent composition.

8. A process according to claim 6 wherein said silica component is present in said sorbent composition in an amount from about 30 to about 40 weight percent based on the weight of said sorbent composition.

9. A process according to claim 2 wherein said colloidal oxide component is used in a quantity that presents an amount of metal oxide in said sorbent composition from about 1 to about 20 weight percent based on the weight of said sorbent composition.

10. A process according to claim 2 wherein said colloidal oxide component is used in a quantity that presents an amount of metal oxide in said sorbent composition from about 5 to about 15 weight percent based on the weight of said sorbent composition.

11. A process according to claim 2 wherein said pore generator component is selected from the group consisting of cellulose, cellulose gel, microcrystalline cellulose, methyl cellulose, zinc stearate, ammonium nitrate, ammonium carbonate, graphite, and mixtures thereof.

12. A process according to claim 11 wherein said pore generator component is present in said sorbent composition in an amount from 1 to about 10 weight percent based on the weight of said sorbent composition.

13. A process according to claim 11 wherein said pore generator component is present in said sorbent composition in an amount from about 3 to about 6 weight percent based on the weight of said sorbent composition.

14. A process according to claim 2 wherein said zinc component is zinc oxide, and wherein said zinc component is present in said sorbent composition in an amount from about 25 to about 75 weight percent based on the weight of said sorbent composition, and wherein said silica component is selected from the group consisting of diatomite, silicate, silica colloid, flame hydrolyzed silica, hydrolyzed silica, precipitated silica, and mixtures thereof, and wherein said silica component is present in said sorbent composition in an amount from about 20 to about 50 weight percent based on the weight of said sorbent composition, and wherein said colloidal oxide component consists essentially of a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from about 1 to about 20 weight percent based on the weight of said sorbent composition, and wherein said pore generator component is selected from the group consisting of cellulose, cellulose gel, microcrystalline cellulose methyl cellulose, zinc stearate, graphite, and mixtures thereof, and wherein pore generator component is present in said sorbent composition in an amount from 1 to about 10 weight percent based on the weight of said sorbent composition.

15. A process according to claim 14 wherein said zinc component is present in said sorbent composition in an amount from about 40 to about 60 weight percent based on the weight of said sorbent composition, and wherein said silica component is present in said sorbent composition in an amount from about 30 to about 40 weight percent based on the weight of said sorbent composition, and wherein said colloidal oxide component is used in a quantity that presents an amount of metal oxide in said sorbent composition from about 5 to about 15 weight percent based on the weight of said sorbent composition, and wherein said pore generator component is present in said sorbent composition in an amount from about 3 to about 6 weight percent based on the weight of said sorbent composition.

16. A process according to claim 2 wherein said zinc component is zinc oxide, and wherein said zinc component is present in said sorbent composition in an amount from about 25 to about 75 weight percent based on the weight of said sorbent composition, and wherein said silica component is diatomite, and wherein said silica component is present in said sorbent composition in an amount from about 20 to about 50 weight percent based on the weight of said sorbent composition, and wherein said colloidal oxide component is selected from the group consisting of colloidal alumina, colloidal silica, and mixtures thereof, and wherein said colloidal oxide component is used in a quantity that presents an amount of metal oxide in said sorbent composition from about 1 to about 20 weight percent based on the weight of said sorbent composition, and wherein said pore generator component is cellulose, and wherein pore generator component is present in said sorbent composition in an amount from 1 to about 10 weight percent based on the weight of said sorbent composition.

17. A process according to claim 16 wherein said zinc component is present in said sorbent composition in an amount from about 40 to about 60 weight percent based on the weight of said sorbent composition, and wherein said silica component is present in said sorbent composition in an amount from about 30 to about 40 weight percent based on the weight of said sorbent composition, and wherein said collodial oxide component is used in a quantity that presents an amount of metal oxide in said sorbent composition from about 5 to about 15 weight percent based on the weight of said sorbent composition, and wherein said pore generator component is present in said sorbent composition in an amount from about 3 to about 6 weight percent based on the weight of said sorbent composition.

18. A process according to claim 2 wherein said moist composition and said extruded, moist composition have a moisture content that is about the same.

19. A process according to claim 18 wherein the moisture content of said extruded, moist composition is within about 10 percent of the moisture content and said moist composition.

20. A process according to claim 19 wherein said zinc component is zinc oxide.

21. A process according to claim 20 wherein said zinc component is present in said sorbent composition in an amount from about 25 to about 75 weight percent based on the weight of said sorbent composition.

22. A process according to claim 20 wherein said zinc component is present in said sorbent composition in an amount from about 40 to about 60 weight percent based on the weight of said sorbent composition.

23. A process according to claim 19 wherein said silica component is selected from the group consisting of diatomite, silicate, flame hydrolyzed silica, hydrolyzed silica, precipitated silica, and mixtures thereof.

24. A process according to claim 23 wherein said silica component is present in said sorbent composition in an amount from about 20 to about 50 weight percent based on the weight of said sorbent composition.

25. A process according to claim 23 wherein said silica component is present in said sorbent composition in an amount from about 30 to about 40 weight percent based on the weight of said sorbent composition.

26. A process according to claim 19 wherein said colloidal oxide component is used in a quantity that presents an amount of metal oxide in said sorbent composition from about 1 to about 20 weight percent based on the weight of said sorbent composition.

27. A process according to claim 19 wherein said colloidal oxide component is used in a quantity that presents an amount of metal oxide in said sorbent composition from about 5 to about 15 weight percent based on the weight of said sorbent composition.

28. A process according to claim 19 wherein said pore generator component is selected from the group consisting of cellulose, cellulose gel, microcrystalline cellulose, methyl cellulose, zinc stearate, ammonium nitrate, ammonium carbonate, graphite, and mixtures thereof.

29. A process according to claim 28 wherein said pore generator component is present in said sorbent composition in an amount from 1 to about 10 weight percent based on the weight of said sorbent composition.

30. A process according to claim 28 wherein said pore generator component is present in said sorbent composition in an amount from about 3 to about 6 weight percent based on the weight of said sorbent composition.

31. A process according to claim 19 wherein said zinc component is zinc oxide, and wherein said zinc component is present in said sorbent composition in an amount from about 25 to about 75 weight percent based on the weight of said sorbent composition, and wherein said silica component is selected from the group consisting of diatomite, silicate, silica colloid, flame hydrolyzed silica, hydrolyzed silica, precipitated silica, and mixtures thereof, and wherein said silica component is present in said sorbent composition in an amount from about 20 to about 50 weight percent based on the weight of said sorbent composition, and wherein said colloidal oxide component consists essentially of a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from about 1 to about 20 weight percent based on the weight of said sorbent composition, and wherein said pore generator component is selected from the group consisting of cellulose, cellulose gel, microcrystalline cellulose methyl cellulose, zinc stearate, graphite, and mixtures thereof, and wherein pore generator component is present in said sorbent composition in an amount from 1 to about 10 weight percent based on the weight of said sorbent composition.

32. A process according to claim 31 wherein said zinc component is present in said sorbent composition in an amount from about 40 to about 60 weight percent based on the weight of said sorbent composition, and wherein said silica component is present in said sorbent composition in an amount from about 30 to about 40 weight percent based on the weight of said sorbent composition, and wherein said collodial oxide component is used in a quantity that presents an amount of metal oxide in said sorbent composition from about 5 to about 15 weight percent based on the weight of said sorbent composition, and wherein said pore generator component is present in said sorbent composition in an amount from about 3 to about 6 weight percent based on the weight of said sorbent composition.

33. A process according to claim 19 wherein said zinc component is zinc oxide, and wherein said zinc component is present in said sorbent composition in an amount from about 25 to about 75 weight percent based on the weight of said sorbent composition, and wherein said silica component is diatomite, and wherein said silica component is present in said sorbent composition in an amount from about 20 to about 50 weight percent based on the weight of said sorbent composition, and wherein said colloidal oxide component is selected from the group consisting of colloidal alumina, colloidal silica, and mixtures thereof, and wherein said colloidal oxide component is used in a quantity that presents an amount of metal oxide in said sorbent composition from about 1 to about 20 weight percent based on the weight of said sorbent composition, and wherein said pore generator component is cellulose, and wherein pore generator component is present in said sorbent composition in an amount from 1 to about 10 weight percent based on the weight of said sorbent composition.

34. A process according to claim 33 wherein said zinc component is present in said sorbent composition in an amount from about 40 to about 60 weight percent based on the weight of said sorbent composition, and wherein said silica component is present in said sorbent composition in an amount from about 30 to about 40 weight percent based on the weight of said sorbent composition, and wherein said collodial oxide component is used in a quantity that presents an amount of metal oxide in said sorbent composition from about 5 to about 15 weight percent based on the weight of said sorbent composition, and wherein said pore generator component is present in said sorbent composition in an amount from about 3 to about 6 weight percent based on the weight of said sorbent composition.

35. A process according to claim 19 wherein said sphered, extruded, moist composition has a particle size from about 1 to about 10 millimeters.

36. A process according to claim 19 wherein said sphered, extruded, moist composition has a particle size from about 2 to about 8 millimeters.

37. A process according to claim 36 wherein said zinc component is zinc oxide.

38. A process according to claim 37 wherein said zinc component is present in said sorbent composition in an amount from about 25 to about 75 weight percent based on the weight of said sorbent composition.

39. A process according to claim 37 wherein said zinc component is present in said sorbent composition in an amount from about 40 to about 60 weight percent based on the weight of said sorbent composition.

40. A process according to claim 36 wherein said silica component is selected from the group consisting of diatomite, silicate, flame hydrolyzed silica, hydrolyzed silica, precipitated silica, and mixtures thereof.

41. A process according to claim 40 wherein said silica component is present in said sorbent composition in an amount from about 20 to about 50 weight percent based on the weight of said sorbent composition.

42. A process according to claim 40 wherein said silica component is present in said sorbent composition in an amount from about 30 to about 40 weight percent based on the weight of said sorbent composition.

43. A process according to claim 36 wherein said colloidal oxide component is used in a quantity that presents an amount of metal oxide in said sorbent composition from about 1 to about 20 weight percent based on the weight of said sorbent composition.

44. A process according to claim 36 wherein said colloidal oxide component is used in a quantity that presents an amount of metal oxide in said sorbent composition from about 5 to about 15 weight percent based on the weight of said sorbent composition.

45. A process according to claim 36 wherein said pore generator component is selected from the group consisting of cellulose, cellulose gel, microcrystalline cellulose, methyl cellulose, zinc stearate, graphite, ammonium nitrate, ammonium carbonate, and mixtures thereof.

46. A process according to claim 45 wherein said pore generator component is present in said sorbent composition in an amount from 1 to about 10 weight percent based on the weight of said sorbent composition.

47. A process according to claim 45 wherein said pore generator component is present in said sorbent composition in an amount from about 3 to about 6 weight percent based on the weight of said sorbent composition.

48. A process according to claim 36 wherein said zinc component is zinc oxide, and wherein said zinc component is present in said sorbent composition in an amount from about 25 to about 75 weight percent based on the weight of said sorbent composition, and wherein said silica component is selected from the group consisting of diatomite, silicate, silica colloid, flame hydrolyzed silica, hydrolyzed silica, precipitated silica, and mixtures thereof, and wherein said silica component is present in said sorbent composition in an amount from about 20 to about 50 weight percent based on the weight of said sorbent composition, and wherein said colloidal oxide component consists essentially of a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from about 1 to about 20 weight percent based on the weight of said sorbent composition, and wherein said pore generator component is selected from the group consisting of cellulose, cellulose gel, microcrystalline cellulose methyl cellulose, zinc stearate, graphite, and mixtures thereof, and wherein pore generator component is present in said sorbent composition in an amount from 1 to about 10 weight percent based on the weight of said sorbent composition.

49. A process according to claim 48 wherein said zinc component is present in said sorbent composition in an amount from about 40 to about 60 weight percent based on the weight of said sorbent composition, and wherein said silica component is present in said sorbent composition in an amount from about 30 to about 40 weight percent based on the weight of said sorbent composition, and wherein said colloidal oxide component is used in a quantity that presents an amount of metal oxide in said sorbent composition from about 5 to about 15 weight percent based on the weight of said sorbent composition, and wherein said pore generator component is present in said sorbent composition in an amount from about 3 to about 6 weight percent based on the weight of said sorbent composition.

50. A process according to claim 36 wherein said zinc component is zinc oxide, and wherein said zinc component is present in said sorbent composition in an amount from about 25 to about 75 weight percent based on the weight of said sorbent composition, and wherein said silica component is diatomite, and wherein said silica component is present in said sorbent composition in an amount from about 20 to about 50 weight percent based on the weight of said sorbent composition, and wherein said colloidal oxide component is selected from the group consisting of colloidal alumina, colloidal silica, and mixtures thereof, and wherein said colloidal oxide component is used in a quantity that presents an amount of metal oxide in said sorbent composition from about 1 to about 20 weight percent based on the weight of said sorbent composition, and wherein said pore generator component is cellulose, and wherein pore generator component is present in said sorbent composition in an amount from 1 to about 10 weight percent based on the weight of said sorbent composition.

51. A process according to claim 50 wherein said zinc component is present in said sorbent composition in an amount from about 40 to about 60 weight percent based on the weight of said sorbent composition, and wherein said silica component is present in said sorbent composition in an amount from about 30 to about 40 weight percent based on the weight of said sorbent composition, and wherein said colloidal oxide component is used in a quantity that presents an amount of metal oxide in said sorbent composition from about 5 to about 15 weight percent based on the weight of said sorbent composition, and wherein said pore generator component is present in said sorbent composition in an amount from about 3 to about 6 weight percent based on the weight of said sorbent composition.

52. A process to make a sorbent composition said process comprising:
(a) contacting
(i) at least one zinc component, where said zinc component consists essentially of zinc oxide, or a compound convertible to zinc oxide,
(ii) at least one silica component, where said silica component consists essentially of silica, or a compound convertible to silica,
(iii) at least one colloidal oxide component, where said colloidal oxide component consists essentially of particles of a metal oxide where said metal oxide is selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof,
(iv) at least one pore generator component, wherein the amount of pore generator is from 1 to about 15 weight percent based on the total weight of said sorbent composition,
(v) at least one Group VIII metal oxide promoter, and where said sorbent composition consists essentially of components (a)(i) through (a)(v),
to form a moist composition, where said moist composition has a moisture content from about 22 to about 31 weight percent based on the weight of said moist composition;
(b) extruding said moist composition to form an extruded, moist composition where said extruded, moist composition has a moisture content from about 22 to about 31 weight percent based on the weight of said extruded, moist composition; and
(c) sphering said extruded, moist composition to form a sphered, extruded, moist composition that has a particle size from about 0.5 to about 15 millimeters.

53. A process according to claim 52 where said silica component and said colloidal oxide component are contacted together before they are further contacted with said other components.

54. A process according to claim 52 wherein said zinc component is zinc oxide.

55. A process according to claim 54 wherein said zinc component is present in said sorbent composition in an amount from about 25 to about 75 weight percent based on the weight of said sorbent composition.

56. A process according to claim 54 wherein said zinc component is present in said sorbent composition in an amount from about 40 to about 60 weight percent based on the weight of said sorbent composition.

57. A process according to claim 53 wherein said silica component is selected from the group consisting of diatomite, silicate, silica colloid, flame hydrolyzed silica, hydrolyzed silica, precipitated silica, and mixtures thereof.

58. A process according to claim 57 wherein said silica component is present in said sorbent composition in an amount from about 20 to about 50 weight percent based on the weight of said sorbent composition.

59. A process according to claim 57 wherein said silica component is present in said sorbent composition in an amount from about 30 to about 40 weight percent based on the weight of said sorbent composition.

60. A process according to claim 53 wherein said colloidal oxide component is used in a quantity that presents an amount of metal oxide in said sorbent composition from about 1 to about 20 weight percent based on the weight of said sorbent composition.

61. A process according to claim 53 wherein said colloidal oxide component is used in a quantity that presents an amount of metal oxide in said sorbent composition from about 5 to about 15 weight percent based on the weight of said sorbent composition.

62. A process according to claim 53 wherein said pore generator component is selected from the group consisting of cellulose, cellulose gel, microcrystalline cellulose methyl cellulose, zinc stearate, graphite, and mixtures thereof.

63. A process according to claim 62 wherein said pore generator component is present in said sorbent composition in an amount from 1 to about 10 weight percent based on the weight of said sorbent composition.

64. A process according to claim 62 wherein said pore generator component is present in said sorbent composition in an amount from about 3 to about 6 weight percent based on the weight of said sorbent composition.

65. A process according to claim 53 wherein said zinc component is zinc oxide, and wherein said zinc component is present in said sorbent composition in an amount from about 25 to about 75 weight percent based on the weight of said sorbent composition, and wherein said silica component is selected from the group consisting of diatomite, silicate, silica colloid, flame hydrolyzed silica, hydrolyzed silica, precipitated silica, and mixtures thereof, and wherein said silica component is present in said sorbent composition in an amount from about 20 to about 50 weight percent based on the weight of said sorbent composition, and wherein said colloidal oxide component consists essentially of a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from 1 to about 20 weight percent based on the weight of said sorbent composition, and wherein said pore generator component is selected from the group consisting of cellulose, cellulose gel, microcrystalline cellulose methyl cellulose, zinc stearate, graphite, and mixtures thereof, and wherein pore generator component is present in said sorbent composition in an amount from 1 to about 10 weight percent based on the weight of said sorbent composition.

66. A process according to claim 65 wherein said zinc component is present in said sorbent composition in an amount from about 40 to about 60 weight percent based on the weight of said sorbent composition, and wherein said silica component is present in said sorbent composition in an amount from about 30 to about 40 weight percent based on the weight of said sorbent composition, and wherein said colloidal oxide component is used in a quantity that presents an amount of metal oxide in said sorbent composition from about 5 to about 15 weight percent based on the weight of said sorbent composition, and wherein said pore generator component is present in said sorbent composition in an amount from about 3 to about 6 weight percent based on the weight of said sorbent composition.

67. A process according to claim 53 wherein said zinc component is zinc oxide, and wherein said zinc component is present in said sorbent composition in an amount from about 25 to about 75 weight percent based on the weight of said sorbent composition, and wherein said silica component is diatomite, and wherein said silica component is present in said sorbent composition in an amount from about 20 to about 50 weight percent based on the weight of said sorbent composition, and wherein said colloidal oxide component is selected from the group consisting of colloidal alumina, colloidal silica, and mixtures thereof, and wherein said colloidal oxide component is used in a quantity that presents an amount of metal oxide in said sorbent composition from about 1 to about 20 weight percent based on the weight of said sorbent composition, and wherein said pore generator component is cellulose, and wherein pore generator component is present in said sorbent composition in an amount from 1 to about 10 weight percent based on the weight of said sorbent composition.

68. A process according to claim 67 wherein said zinc component is present in said sorbent composition in an amount from about 40 to about 60 weight percent based on the weight of said sorbent composition, and wherein said silica component is present in said sorbent composition in an amount from about 30 to about 40 weight percent based on the weight of said sorbent composition, and wherein said colloidal oxide component is used in a quantity that presents an amount of metal oxide in said sorbent composition from about 5 to about 15 weight percent based on the weight of said sorbent composition, and wherein said pore generator component is present in said sorbent composition in an amount from about 3 to about 6 weight percent based on the weight of said sorbent composition.

69. A process according to claim 53 wherein said moist composition and said extruded, moist composition have a moisture content that is about the same.

70. A process according to claim 69 wherein the moisture content of said extrude, moist composition is within about 10 percent of the moisture content and said moist composition.

71. A process according to claim 70 wherein said zinc component is zinc oxide.

72. A process according to claim 71 wherein said zinc component is present in said sorbent composition in an amount from about 25 to about 75 weight percent based on the weight of said sorbent composition.

73. A process according to claim 71 wherein said zinc component is present in said sorbent composition in an amount from about 40 to about 60 weight percent based on the weight of said sorbent composition.

74. A process according to claim 70 wherein said silica component is selected from the group consisting of diatomite, silicate, silica colloid, flame hydrolyzed silica, hydrolyzed silica, precipitated silica, and mixtures thereof.

75. A process according to claim 74 wherein said silica component is present in said sorbent composition in an amount from about 20 to about 50 weight percent based on the weight of said sorbent composition.

76. A process according to claim 74 wherein said silica component is present in said sorbent composition in an amount from about 30 to about 40 weight percent based on the weight of said sorbent composition.

77. A process according to claim 70 wherein said colloidal oxide component is used in a quantity that presents an amount of metal oxide in said sorbent composition from about 1 to about 20 weight percent based on the weight of said sorbent composition.

78. A process according to claim 70 wherein said colloidal oxide component is used in a quantity that presents an amount of metal oxide in said sorbent composition from about 5 to about 15 weight percent based on the weight of said sorbent composition.

79. A process according to claim 70 wherein said pore generator component is selected from the group consisting of cellulose, cellulose gel, microcrystalline cellulose methyl cellulose, zinc stearate, graphite, and mixtures thereof.

80. A process according to claim 79 wherein said pore generator component is present in said sorbent composition in an amount from 1 to about 10 weight percent based on the weight of said sorbent composition.

81. A process according to claim 79 wherein said pore generator component is present in said sorbent composition in an amount from about 3 to about 6 weight percent based on the weight of said sorbent composition.

82. A process according to claim 70 wherein said zinc component is zinc oxide, and wherein said zinc component is present in said sorbent composition in an amount from about 25 to about 75 weight percent based on the weight of said sorbent composition, and wherein said silica component is selected from the group consisting of diatomite, silicate, silica colloid, flame hydrolyzed silica, hydrolyzed silica, precipitated silica, and mixtures thereof, and wherein said silica component is present in said sorbent composition in an amount from about 20 to about 50 weight percent based on the weight of said sorbent composition, and wherein said colloidal oxide component consists essentially of a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from about 1 to about 20 weight percent based on the weight of said sorbent composition, and wherein said pore generator component is selected from the group consisting of cellulose, cellulose gel, microcrystalline cellulose methyl cellulose, zinc stearate, graphite, and mixtures thereof, and wherein pore generator component is present in said sorbent composition in an amount from 1 to about 10 weight percent based on the weight of said sorbent composition.

83. A process according to claim 82 wherein said zinc component is present in said sorbent composition in an amount from about 40 to about 60 weight percent based on the weight of said sorbent composition, and wherein said silica component is present in said sorbent composition in an amount from about 30 to about 40 weight percent based on the weight of said sorbent composition, and wherein said colloidal oxide component is used in a quantity that presents an amount of metal oxide in said sorbent composition from about 5 to about 15 weight percent based on the weight of said sorbent composition, and wherein said pore generator component is present in said sorbent composition in an amount from about 3 to about 6 weight percent based on the weight of said sorbent composition.

84. A process according to claim 70 wherein said zinc component is zinc oxide, and wherein said zinc component is present in said sorbent composition in an amount from about 25 to about 75 weight percent based on the weight of said sorbent composition, and wherein said silica component is diatomite, and wherein said silica component is present in said sorbent composition in an amount from about 20 to about 50 weight percent based on the weight of said sorbent composition, and wherein said colloidal oxide component is selected from the group consisting of colloidal alumina, colloidal silica, and mixtures thereof, and wherein said colloidal oxide component is used in a quantity that presents an amount of metal oxide in said sorbent composition from about 1 to about 20 weight percent based on the weight of said sorbent composition, and wherein said pore generator component is cellulose, and wherein pore generator component is present in said sorbent composition in an amount from about 1 to about 10 weight percent based on the weight of said sorbent composition.

85. A process according to claim 84 wherein said zinc component is present in said sorbent composition in an amount from about 40 to about 60 weight percent based on the weight of said sorbent composition, and wherein said silica component is present in said sorbent composition in an amount from about 30 to about 40 weight percent based on the weight of said sorbent composition, and wherein said colloidal oxide component is used in a quantity that presents an amount of metal oxide in said sorbent composition from about 5 to about 15 weight percent based on the weight of said sorbent composition, and wherein said pore generator component is present in said sorbent composition in an amount from about 3 to about 6 weight percent based on the weight of said sorbent composition.

86. A process according to claim 70 wherein said sphered, extruded, moist composition has a particle size from about 1 to about 10 millimeters.

87. A process according to claim 70 wherein said sphered, extruded, moist composition has a particle size from about 2 to about 8 millimeters.

88. A process according to claim 87 wherein said zinc component is zinc oxide.

89. A process according to claim 88 wherein said zinc component is present in said sorbent composition in an amount from about 25 to about 75 weight percent based on the weight of said sorbent composition.

90. A process according to claim 88 wherein said zinc component is present in said sorbent composition in an amount from about 40 to about 60 weight percent based on the weight of said sorbent composition.

91. A process according to claim 87 wherein said silica component is selected from the group consisting of diatomite, silicate, silica colloid, flame hydrolyzed silica, hydrolyzed silica, precipitated silica, and mixtures thereof.

92. A process according to claim 91 wherein said silica component is present in said sorbent composition in an amount from about 20 to about 50 weight percent based on the weight of said sorbent composition.

93. A process according to claim 91 wherein said silica component is present in said sorbent composition in an amount from about 30 to about 40 weight percent based on the weight of said sorbent composition.

94. A process according to claim 87 wherein said colloidal oxide component is used in a quantity that presents an amount of metal oxide in said sorbent composition from about 1 to about 20 weight percent based on the weight of said sorbent composition.

95. A process according to claim 87 wherein said colloidal oxide component is used in a quantity that presents an amount of metal oxide in said sorbent composition from about 5 to about 15 weight percent based on the weight of said sorbent composition.

96. A process according to claim 87 wherein said pore generator component is selected from the group consisting of cellulose, cellulose gel, microcrystalline cellulose methyl cellulose, zinc stearate, graphite, and mixtures thereof.

97. A process according to claim 87 wherein said pore generator component is present in said sorbent composition in an amount from 1 to about 10 weight percent based on the weight of said sorbent composition.

98. A process according to claim 87 wherein said pore generator component is present in said sorbent composition in an amount from about 3 to about 6 weight percent based on the weight of said sorbent composition.

99. A process according to claim 87 wherein said zinc component is zinc oxide, and wherein said zinc component is present in said sorbent composition in an amount from about 25 to about 75 weight percent based on the weight of said sorbent composition, and wherein said silica component is selected from the group consisting of diatomite, silicate, silica colloid, flame hydrolyzed silica, hydrolyzed silica, precipitated silica, and mixtures thereof, and wherein said silica component is present in said sorbent composition in an amount from about 20 to about 50 weight percent based on the weight of said sorbent composition, and wherein said colloidal oxide component consists essentially of a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof, and wherein said colloidal oxide component is used in a quantity that presents an amount of metal oxide in said sorbent composition from about 1 to about 20 weight percent based on the weight of said sorbent composition, and wherein said pore generator component is selected from the group consisting of cellulose, cellulose gel, microcrystalline cellulose methyl cellulose, zinc stearate, graphite, and mixtures thereof, and wherein pore generator component is present in said sorbent composition in an amount from 1 to about 10 weight percent based on the weight of said sorbent composition.

100. A process according to claim 99 wherein said zinc component is present in said sorbent composition in an amount from about 40 to about 60 weight percent based on the weight of said sorbent composition, and wherein said silica component is present in said sorbent composition in an amount from about 30 to about 40 weight percent based on the weight of said sorbent composition, and wherein said colloidal oxide component is used in a quantity that presents an amount of metal oxide in said sorbent composition from about 5 to about 15 weight percent based on the weight of said sorbent composition, and wherein said pore generator component is present in said sorbent composition in an amount from about 3 to about 6 weight percent based on the weight of said sorbent composition.

101. A process according to claim 87 wherein said zinc component is zinc oxide, and wherein said zinc component is present in said sorbent composition in an amount from about 25 to about 75 weight percent based on the weight of said sorbent composition, and wherein said silica component is diatomite, and wherein said silica component is present in said sorbent composition in an amount from about 20 to about 50 weight percent based on the weight of said sorbent composition, and wherein said colloidal oxide component is selected from the group consisting of colloidal alumina, colloidal silica, and mixtures thereof, and wherein said colloidal oxide component is used in a quantity that presents an amount of metal oxide in said sorbent composition from about 1 to about 20 weight percent based on the weight of said sorbent composition, and wherein said pore generator component is cellulose, and wherein pore generator component is present in said sorbent composition in an amount from 1 to about 1 0 weight percent based on the weight of said sorbent composition.

102. A process according to claim 101 wherein said zinc component is present in said sorbent composition in an amount from about 40 to about 60 weight percent based on the weight of said sorbent composition, and wherein said silica component is present in said sorbent composition in an amount from about 30 to about 40 weight percent based on the weight of said sorbent composition, and wherein said colloidal oxide component is used in a quantity that presents an amount of metal oxide in said sorbent composition from about 5 to about 15 weight percent based on the weight of said sorbent composition, and wherein said pore generator component is present in said sorbent composition in an amount from about 3 to about 6 weight percent based on the weight of said sorbent composition.

* * * * *